(12) United States Patent
Arrive et al.

(10) Patent No.: US 12,530,136 B2
(45) Date of Patent: Jan. 20, 2026

(54) PROTECTION OF AN AUTHENTICATION METHOD

(71) Applicant: STMicroelectronics (Grand Ouest) SAS, Le Mans (FR)

(72) Inventors: Fabien Arrive, Chasné-sur-illet (FR); Yves Magnaud, Chateaugiron (FR)

(73) Assignee: STMicroelectronics (Grand Ouest) SAS, Le Mans (FR)

( * ) Notice: Subject to any disclaimer, the term of this patent is extended or adjusted under 35 U.S.C. 154(b) by 172 days.

(21) Appl. No.: 18/531,044

(22) Filed: Dec. 6, 2023

(65) Prior Publication Data

US 2024/0201873 A1    Jun. 20, 2024

(30) Foreign Application Priority Data

Dec. 20, 2022   (FR) .................................. FR2213951

(51) Int. Cl.
    *G06F 21/44*    (2013.01)
    *G06F 3/06*     (2006.01)

(52) U.S. Cl.
    CPC .......... *G06F 3/0622* (2013.01); *G06F 3/0679* (2013.01)

(58) Field of Classification Search
    None
    See application file for complete search history.

(56) References Cited

U.S. PATENT DOCUMENTS

| 2002/0026586 | A1* | 2/2002 | Ito ........................ H04W 12/50 713/183 |
| 2005/0005131 | A1 | 1/2005 | Yoshida et al. |
| 2007/0195606 | A1* | 8/2007 | Urabe ................ G11C 16/0441 365/207 |
| 2013/0015915 | A1* | 1/2013 | Komatsu .......... G11C 29/12005 327/564 |

(Continued)

FOREIGN PATENT DOCUMENTS

EP    1677261 A2    7/2006

OTHER PUBLICATIONS

Zhou et al. A verification method for power-off protection mechanism of embedded chip non-volatile memory, published Aug. 26, 2021 (Year: 2021).*

(Continued)

*Primary Examiner* — Joshua Joo
(74) *Attorney, Agent, or Firm* — Seed IP Law Group LLP

(57) ABSTRACT

A device executes an authentication process protected by an authentication counter that is incremented in case of an authentication failure. The incrementation of the counter is protected against unexpected device power-off or power-off attacks. A non-volatile memory is divided into pairs of cells. The protecting includes writing a fixed value D into an active pair of two consecutive cells. As long as successful authentications occur, the content of the first cell is overwritten by a random value. When a failed authentication occurs, the content of the second cell is overwritten by a random value and the next two consecutive cells are written (Continued)

with the fixed value D. Those cells form the active pair and the protection process is repeated. This mechanism facilitates preventing the lack of incrementation of the authentication counter in case of unexpected device power-off during the processing of a failed authentication.

25 Claims, 4 Drawing Sheets

(56) References Cited

U.S. PATENT DOCUMENTS

| | | | | |
|---|---|---|---|---|
| 2014/0136806 | A1* | 5/2014 | Rudelic | G06F 21/552 |
| | | | | 711/163 |
| 2018/0329770 | A1* | 11/2018 | Saito | G11C 16/3431 |
| 2021/0141902 | A1* | 5/2021 | Martel | G06F 21/57 |

OTHER PUBLICATIONS

"Securing nonvolatile, nonresettable counters in embedded designs," May 15, 2011, URL=https://web.archive.org/web/20200923071045/https://www.embedded.com/securing-nonvolatile-nonresettable-counters-in-embedded-designs/. (6 pages).

* cited by examiner

PROTECTION OF AN AUTHENTICATION METHOD

TECHNICAL FIELD

The present disclosure generally concerns electronic systems and devices, such as smartcards, trusted platform modules, etc., and their use concerning the use of an authentication method. More particularly, the present disclosure relates to the protection, or securing, of authentication methods.

DESCRIPTION OF THE RELATED ART

A communication between two electronic devices, or circuits, may be preceded, for security and/or confidentiality reasons, by an authentication phase. During this phase, an authentication method, employed by the two devices, enables to verify, for example, whether the two devices are authorized to exchange information together, or, for example, if a device is authorized to use one or a plurality of services provided by the other device. The authentication method is a means of protection against malicious devices attempting to access to data and/or to functionalities of other devices.

According to another example, an authentication method may enable to verify the identity of a user before the use of an electronic device or the use of one or a plurality of services provided by the electronic device.

BRIEF SUMMARY

In an embodiment, a device includes a memory and processing circuitry coupled to the memory. The memory is organized as a plurality of pairs of memory cells. The processing circuitry executes an authentication process, and protects the execution of the authentication process. The protecting includes storing a first data element in a first memory cell of a first pair of memory cells, and storing a second data element in a second memory cell of the first pair of memory cells, the first pair of memory cells being a current active pair of memory cells. In response to a successful authentication, the first memory cell is rewritten with a third data element. In response to a failed authentication, the second memory cell is rewritten with a fourth data element, a failure counter is incremented, a fifth data element is written into a first memory cell of a second pair of memory cells, a sixth data element is written into a second memory cell of the second pair of memory cells, and the second pair of memory cells is designated as the current active pair of memory cells.

In an embodiment, a method comprises executing, using an electronic device, an authentication process, and protecting the execution of the authentication process. The protecting of the execution of the authentication process includes storing a first data element in a first memory cell of a first pair of a plurality of pairs of memory cells, and storing a second data element in a second memory cell of the first pair of memory cells, the first pair of memory cells being a current active pair of memory cells. In response to the authentication process resulting in a successful authentication, the first memory cell of the first pair of memory cells is rewritten with a third data element. In response to the authentication process resulting in a failed authentication, the second memory cell of the first pair of memory cells is rewritten with a fourth data element, a failure counter is incremented, a fifth data element is written into a first memory cell of a second pair of memory cells of the plurality of pairs of memory cells, a sixth data element is written into a second memory cell of the second pair of memory cells, and the second pair of memory cells is designated as the current active pair of memory cells.

In an embodiment, a system comprises a first electronic device and a second electronic device coupled to the first electronic device. The second electronic device responds to an authentication request received from the first electronic device by executing an authentication process and protecting the execution of the authentication process. The protecting of the execution of the authentication process includes storing a first data element in a first memory cell of a first pair of memory cells of a plurality of pairs of memory cells and storing a second data element in a second memory cell of the first pair of memory cells, the first pair of memory cells being a current active pair of memory cells. In response to the authentication process resulting in a successful authentication, the first memory cell of the first pair of memory cells is rewritten with a third data element. In response to the authentication process resulting in a failed authentication, the second memory cell of the first pair of memory cells is rewritten with a fourth data element, a failure counter is incremented, a fifth data element is written into a first memory cell of a second pair of memory cells of the plurality of pairs of memory cells, a sixth data element is written into a second memory cell of the second pair of memory cells, and the second pair of memory cells is designated as the current active pair of memory cells.

In an embodiment, a non-transitory computer-readable medium's contents, in operation, configure a processing device to perform a method. The method comprises executing, using an electronic device, an authentication process, and protecting the execution of the authentication process. The protecting of the execution of the authentication process includes storing a first data element in a first memory cell of a first pair of a plurality of pairs of memory cells, and storing a second data element in a second memory cell of the first pair of memory cells, the first pair of memory cells being a current active pair of memory cells. In response to the authentication process resulting in a successful authentication, the first memory cell of the first pair of memory cells is rewritten with a third data element. In response to the authentication process resulting in a failed authentication, the second memory cell of the first pair of memory cells is rewritten with a fourth data element, a failure counter is incremented, a fifth data element is written into a first memory cell of a second pair of memory cells of the plurality of pairs of memory cells, a sixth data element is written into a second memory cell of the second pair of memory cells, and the second pair of memory cells is designated as the current active pair of memory cells.

BRIEF DESCRIPTION OF THE SEVERAL VIEWS OF THE DRAWINGS

The foregoing and other features and advantages will be discussed in detail in the following non-limiting description of specific embodiments in connection with the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, no detailed explanation is given concerning the authentication methods to which the protection method applies. Indeed, most usual authentication methods are compatible with the described embodiments.

Unless indicated otherwise, when reference is made to two elements connected together, this signifies a direct connection without any intermediate elements other than conductors, and when reference is made to two elements coupled together, this signifies that these two elements can be connected, or they can be coupled via one or more other elements.

In the following description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred, unless specified otherwise, to the orientation of the drawings.

Unless specified otherwise, the expressions "about," "approximately," "substantially," and "in the order of" signify plus or minus 10%, preferably of plus or minus 5%.

The embodiments described hereafter concern the protection of an electronic device, and more particularly the protection of a failure counter associated with an authentication method against malicious attacks. Indeed, it may be useful to count the use of an authentication method resulting in a failure, consecutive or not, to, for example, prevent a malicious user from authenticating with the electronic device.

The use of such a counter is however vulnerable to different types of malicious attacks, including, for example, attacks by powering off. Indeed, in certain cases, it may be sufficient to turn off the power supply of said failure counter to prevent its incrementation.

The embodiments described hereafter provide a protection mechanism associated with the counter and enabling to secure the incrementation of the counter. This mechanism comprises rewriting or writing specific data into the memory before and after the incrementation of the counter after a failure of the authentication method. These rewrite and/or write operations are described in detail in relation with FIG. 3. When a cutting off of the power supply occurs, it is sufficient, at the time of the restarting of the device, to verify the state of these specific data to determine whether the last use of the authentication method has resulted in a failure or in a success.

Figure 1:
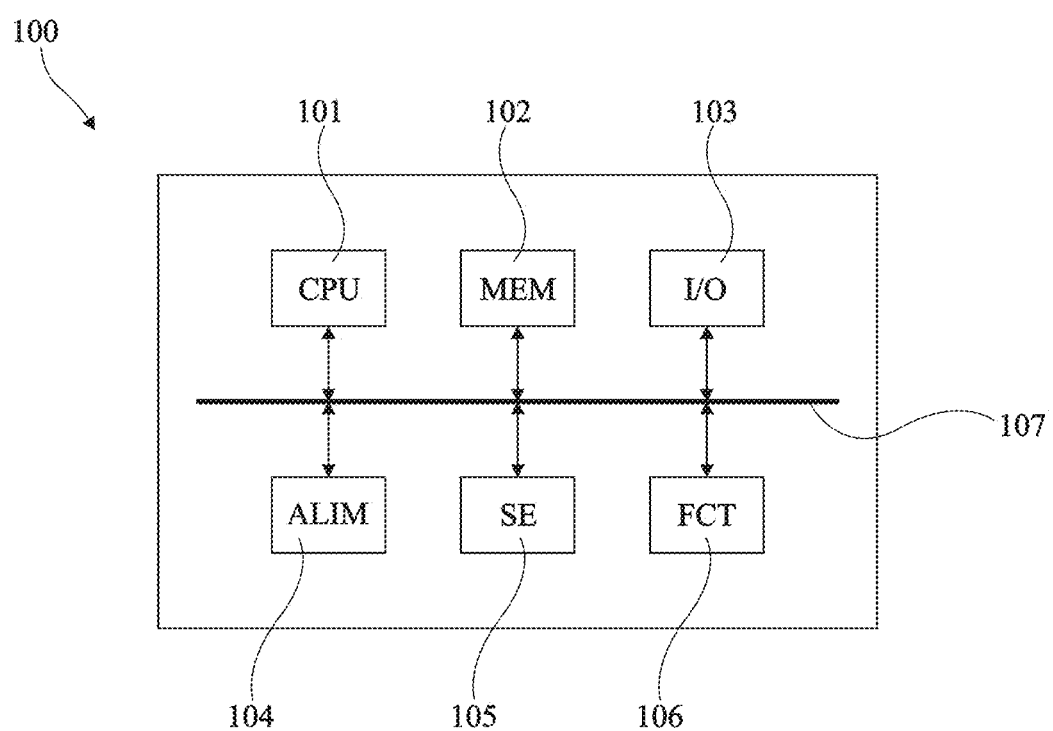
FIG. 1 shows an example of an electronic device.
Figure 2:
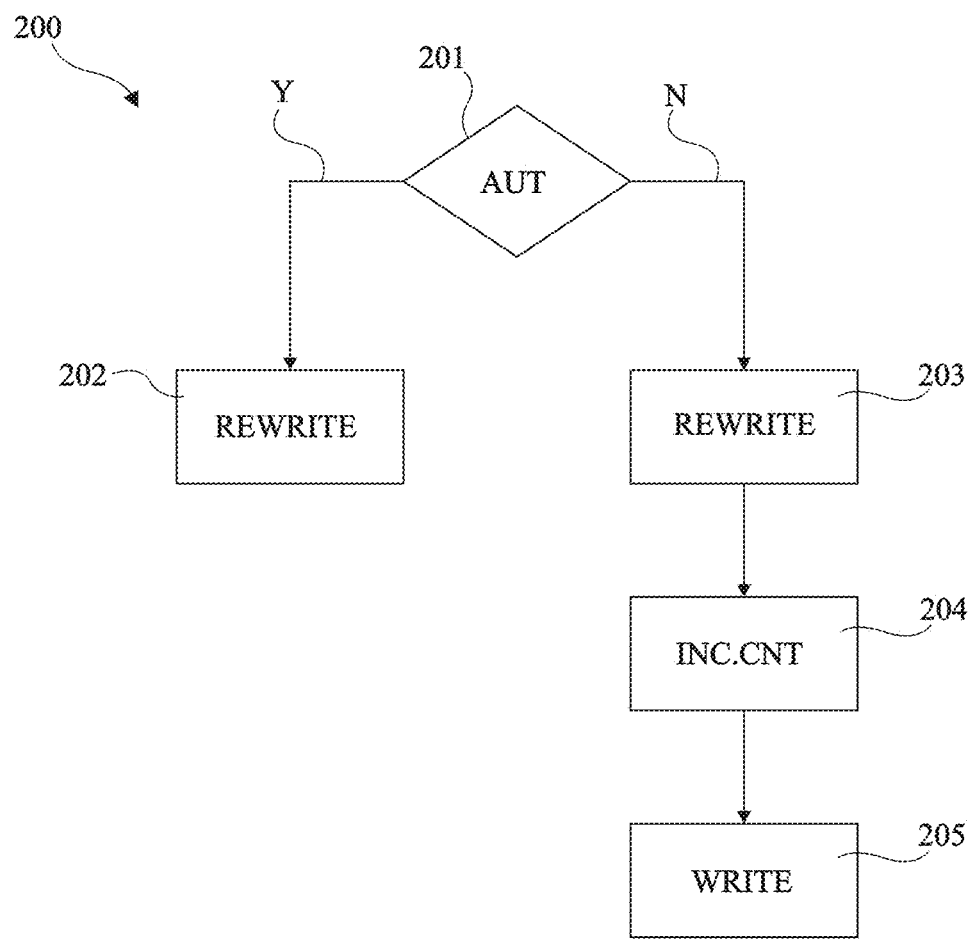
FIG. 2 shows a block-diagram illustrating the steps of an embodiment of a method of protecting an authentication method.
Figure 3:
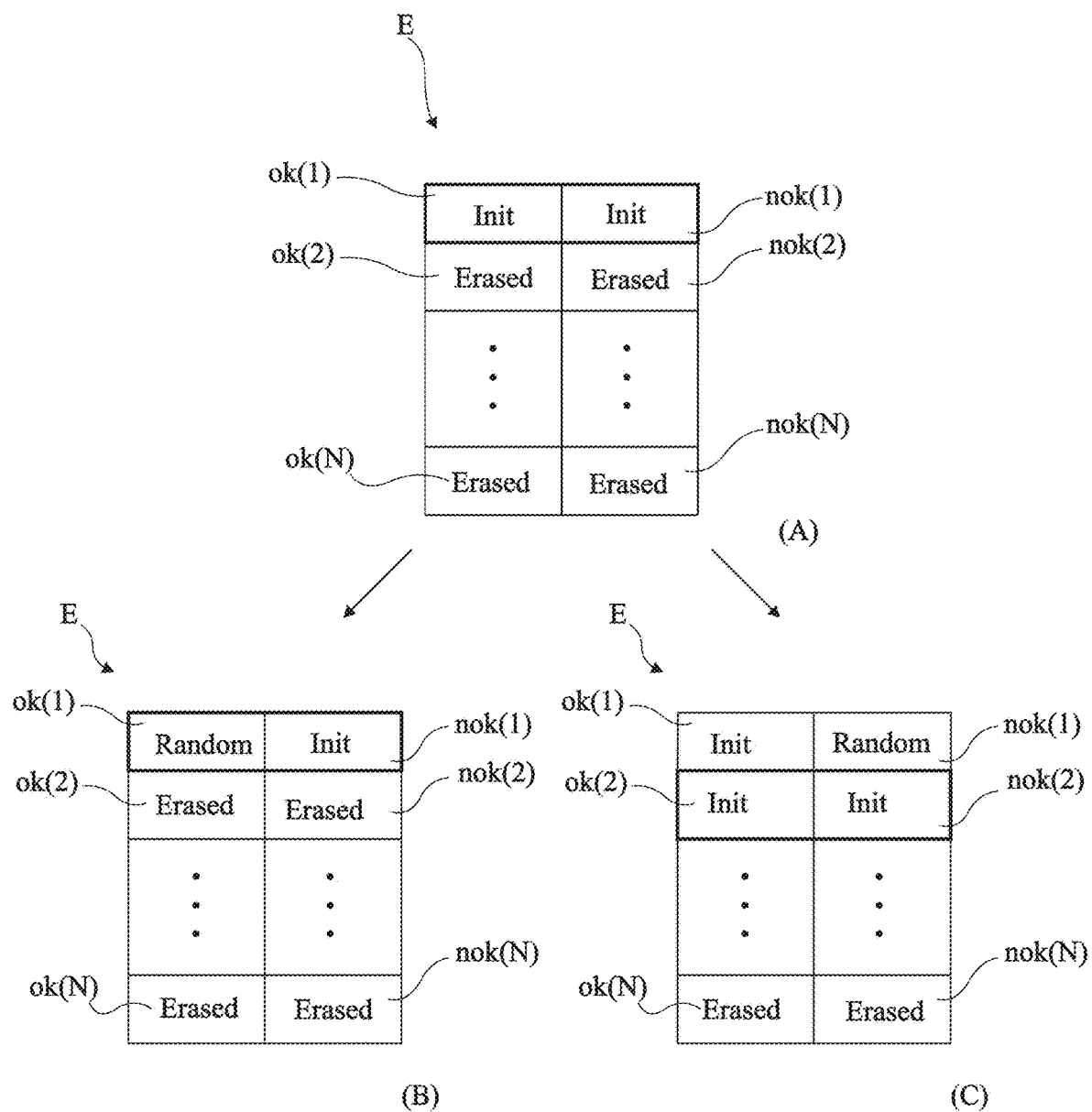
FIG. 3 shows a diagram illustrating in further detail an example of the embodiment of FIG. 2.

FIG. 1 very schematically shows in the form of blocks an example of an electronic device to which the embodiments described in relation with FIGS. 2 and 3 may apply.

Device 100 is an electronic device adapted to processing data, and which is configured, for example, to perform an authentication method. An authentication method is a method during which a first device, or a user, identifies with a second device, for example, by exchange of an identifier and of a password, or, for example, by proving the knowledge of secret information such as a password, a personal identification number (PIN), or even a random value. During the use of the authentication method, device 100 may indifferently have the role of the first device or of the second device, or also only have the role of an intermediary between the first and second devices. Further, and according to an embodiment, device 100 and the authentication method are insensitive to side channel attacks.

In the rest of the disclosure, there is called failure of an authentication method the case where an authentication method is used but does not result in the authentication of the first device, or of the user, with the second device. Further, there is called success of an authentication method the case where the authentication method is used and results in the authentication of the first device with the second device.

Device 100 is configured to employ a failure counter associated with said authentication method. More particularly, each time the authentication method fails, the counter is incremented. According to an example, such a failure counter may enable device 100 to prevent a new trial of the authentication method after a previously defined number of failures, consecutive or not.

Device 100 comprises a processor 101 (CPU) enabling to process data. According to an example, device 100 may comprise a plurality of processors, each adapted to processing different types of data. According to a specific example, device 100 may comprise a main processor and a secure processor adapted to only processing critical or secure data. According to an example, processor 101 may be configured to employ the previously-described authentication method and/or failure counter.

Device 100 comprises one or a plurality of memories 102 (MEM) having data, for example, binary data, stored therein. According to an example, device 100 comprises a plurality of memory types, such as a ROM, a volatile memory, and/or a non-volatile memory. According to an embodiment, device 100 comprises a non-volatile memory, and according to an embodiment, this non-volatile memory is a Flash-type memory, that is, a non-volatile memory keeping the data that it stores even after a power failure. Further, certain Flash-type memories comprise an error detection and/or correction mechanism.

Device 100 optionally comprises one or a plurality of input/output circuits 103 (I/O) enabling device 100 to transmit and/or receive data and/or energy to or from one or a plurality of external electronic devices.

Device 100 comprises one or a plurality of circuits 104 (ALIM) taking charge of the power supply of device 100. According to an example, circuits 104 may comprise one or a plurality of batteries, power conversion circuits, charge circuits, etc.

Device 100 optionally comprises one or a plurality of secure elements 105 (SE) allowing the management of critical or secure data, such as the storage or the use of these data, or enabling, for example, to perform the authentication method. According to an example, secure element 105 may be configured to implement the described authentication methods and/or failure counter. According to an embodiment, secure element 105 may comprise one or a plurality of specific processors of the type of processor 101, memories of the type of memories 102, input/output circuits of the type of circuits 103, and circuits implementing various functions of the type of circuits 106.

Device 100 comprises one or a plurality of circuits 106 (FCT) implementing one or a plurality of functionalities of device 100. According to an example, circuits 106 may comprise specific data processing circuits, such as cipher circuits, or circuits enabling to perform measurements, such as sensors. According to an example, circuit(s) 106 may be configured to perform the described authentication methods and/or failure counter.

Device 100 comprises one or a plurality of communication buses 107 enabling all the circuits of device 100 to communicate. In FIG. 1, a single bus 107 coupling processor 101, memory or memories 102, and circuits 103 to 106 is shown, but in practice, device 100 may comprise a plurality of communication buses coupling these different elements.

According to a specific embodiment, device 100 is adapted to implement at least one counter, for example, by using processor 101 or a dedicated circuit from among circuits 106.

According to another embodiment, device 100 is a complex electronic system such as a programmable electronic device, such as a computer. According to still another embodiment, device 100 is formed of a single processor, or microprocessor, and of a memory.

According to an embodiment, device 100 is a secure element comprising at least one processor and one non-volatile memory. According to an embodiment, device 100 is a secure controller or microcontroller.

FIG. 2 is a block diagram illustrating a method 200 of protection, or mechanism of protection, of an authentication method performed by a device such as the device 100 described in relation with FIG. 1.

Protection method 200 comprises the rewriting, and the writing if relevant, of one or a plurality of data elements into a non-volatile memory of the electronic device, theses data are also called tags. According to an embodiment, the concerned data are stored in a non-volatile memory of the electronic device. According to an embodiment, the concerned data are stored in a Flash-type memory of the electronic device.

In the rest of the disclosure, there is called unwritten memory cell, or erased memory cell, a memory cell having had its content erased and the reading of which generates an error. In other words, there is called unwritten memory cell a memory cell containing no data. There is called written memory cell a memory cell containing data written during a write operation, and the reading of which returns the value of the stored data.

Further, in the rest of the disclosure, there is called write operation an operation during which a data element is written into a unwritten memory cell, or erased memory cell, and there is called rewrite operation an operation during which a data element is written into a written memory cell, that is, an operation during which data are reprogrammed instead of the data stored in the written memory cell, or also a step during which a memory cell is rewritten into with another data element.

Further, method 200 uses an assembly E of memory cells of the non-volatile memory. Each memory cell is associated with, or is located at, a memory address and is capable of storing a data element.

The assembly of memory cells E comprises N pairs of memory cells, N being a positive integer. Each pair of memory cells is noted, for example, (ok(n), nok(n)), n being an integer varying from 1 to N. The first memory cell ok(n) of a pair is linked to the success of the authentication method, and the second cell nok(n) of a pair is linked to the failures of the authentication method.

The N pairs comprised in assembly E are sequentially addressed so that the pairs are successively selected. The current pair is designated as being the active pair of the assembly. To be the active pair, a pair has to comprise two written memory cells.

According to a specific example, assembly E is a portion of the non-volatile memory comprising twice N memory cells. According to a specific example, the memory cells of a same pair have consecutive addresses.

Protection method 200 comprises an initial step 201 (AUT) of use of the authentication method resulting either in a failure (output N of the block of step 201) or in a success (output Y of the block of step 201).

When step 201 results in a success, the next step is a step 202 (REWRITE) during which an operation of rewriting into the first memory cell ok(n) of the active pair linked to the successes of the authentication method is performed.

When step 201 results in a failure, the next step is a step 203 (REWRITE) during which an operation of rewriting into the second memory cell nok(n) of the active pair linked to failures of the authentication method is performed.

At a step 204 (INC CNT), subsequent to step 203, the failure counter associated with the authentication method performed at step 201 is incremented.

At a step 205 (WRITE), subsequent to step 204, two operations of writing into another pair of memory cells (ok(n+1), nok(n+1)) are performed.

Figure 4:
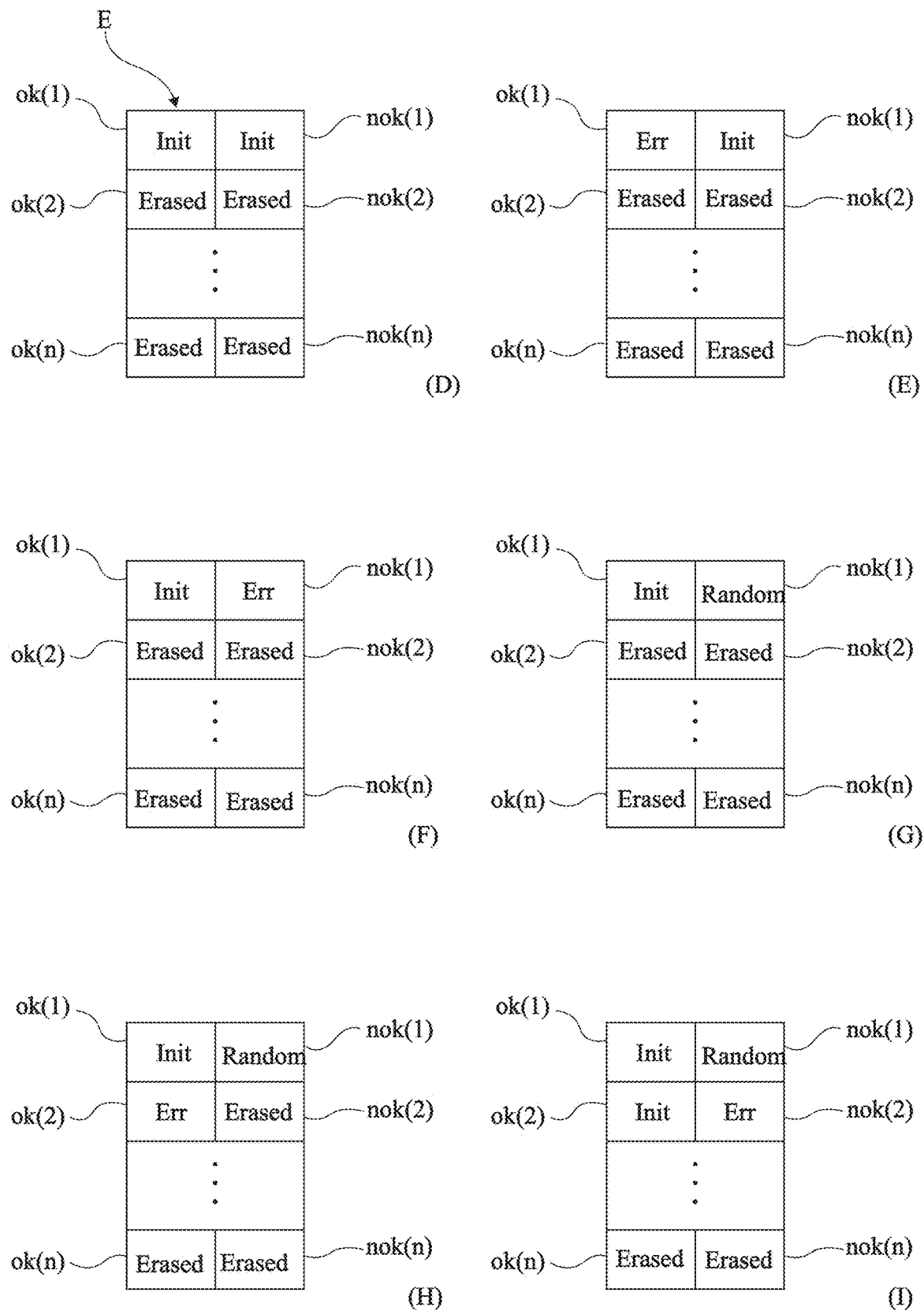
FIG. 4 shows a diagram illustrating in further detail an example of the embodiment of FIG. 2.

FIG. 3 illustrates in further detail the rewrite and write operations performed during steps 202, 203, and 205. FIG. 4 illustrates in further detail the advantages of method 200 against a power-off attack.

An advantage of this embodiment is that as long as the use of the authentication method result in successes, only one rewrite operation is carried out. In other words, a success of an authentication method does not generate the writing of data into memory cells unwritten up to then. The number of erase operations is thus limited. This has the advantage of limiting the wearing of certain memories such as memories for which an erase operation is necessary.

FIG. 3 is a diagram illustrating a practical example of the steps of rewriting and writing into the memory cells of assembly E described in relation with FIG. 2.

As previously described, steps 202, 203, and 205 comprise the rewriting, and the writing if relevant, of one or a plurality of data stored in memory cells of a non-volatile memory of the electronic device.

The general operation of method 200 is the following.

Each time the authentication method is successful, the first memory cell ok(n) of the active pair (ok(n), nok(n)) is rewritten into, and the second memory cell nok(n) is left unchanged, this is the step 202 described in relation with FIG. 2. More particularly, pair (ok(n), nok(n)) being the active pair, memory cells ok(n) and nok(n) are written memory cells, and a data element is rewritten into memory cell ok(n) in place of the previous data element. Pair (ok(n), nok(n)) is still selected as being the active pair.

Each time the authentication method fails, the second memory cell nok(n) of the active pair (ok(n), nok(n)) is rewritten into, and the first memory cell ok(n) is left unchanged, this is the step 203 described in relation with FIG. 2. More particularly, a data element is rewritten into memory cell nok(n) in place of the previous data element. The failure counter is incremented, after which data are written into another pair (ok(i), nok(i)), i being an integer varying from 1 to N and being different from n, only comprising erased memory cells, this is the step 205 described in relation with FIG. 2. According to a specific embodiment, the other pair (ok(i), nok(i)) is the next pair of memory cells, that is, pair (ok(n+1 modulo N), nok(n+1 modulo N)). Pair (ok(i), nok(i)) then becomes the new active pair and pair (ok(n), nok(n)) is no longer the active pair.

According to a specific example, at an initial state (A), no authentication method has been performed yet by the electronic device, and only one pair (ok(n), nok(n)) comprises written memory cells, for example pair (ok(1), nok(1)). This pair (ok(1), nok(1)) is selected to be the active pair. According to an example, a fixed data element Init is written into memory cells ok(1) and nok(1). Accordingly, all the other memory cells of the other pairs of the assembly are erased, that is, the cells of pairs (ok(2), nok(2)) to (ok(N), nok(N)). In FIGS. 3 and 4, the erased memory cells are designated with reference Erased.

If the next use of the authentication method results in a success, the next state is a state (B), conversely, if the next use of the authentication method results in a failure, the next state is a state (C).

At state (B), the previous use of the authentication method is a success, accordingly the step 202 of FIG. 2 is performed. In other words, a data element Random is rewritten into memory cell ok(1) in place of fixed data element Init. No other rewrite or write operation is implemented. Pair (ok(1), nok(1)) remains the active pair. According to a specific embodiment, then data element Random is, for example, a random data element different from the fixed data element Init.

At state (C), the previous use of the authentication method is a failure, accordingly the steps 203 to 205 of FIG. 2 are performed. In other words, a data element Random is rewritten into memory cell nok(1). The failure counter is incremented by one unit. Data are written into another pair of memory cells comprising erased memory cells, for example, pair (ok(2), nok(2)). Fixed data element Init is written into memory cell ok(2) and into memory cell nok(2). This pair (ok(2), nok(2)) becomes the active pair.

Further, once all the pairs of memory cells have been written into, an operation of erasing of the data written in all the memory cells of assembly E is performed, and data are written into the memory cells of a pair to return to the initial state (A). According to an alternative embodiment, the memory cells of assembly E may be regularly erased by group. Indeed, for certain types of non-volatile memories, such as Flash-type memories, an operation of erasing of a data element written into the memory generally comprises the erasing of data written into an elementary group formed of a plurality of memory cells, called a page. Thus, each time a page of assembly E is completely filled, an erase operation occurs before the writing of new data into the page.

By using the protection method 200 described herein, it is possible to know whether the authentication method has been targeted by a power-off attack or not. Further, this protection method also enables to know whether the last use of the authentication method has resulted in a success or a failure, even in the case where an attack by powering off of the electronic device is executed. This is described in further detail in relation with FIG. 4.

Further, as previously mentioned, the embodiment of the protection method may be a program product implemented by a programmable device or a computer. Further, when the embodiment is a computer program product or a program product of a programmable device, it may be recorded on a support for recording data readable by a computer or by said programmable device.

FIG. 4 comprises diagrams illustrating the state of the memory cells of assembly E of the protection method after a power-off attack has been attempted and the device has been restarted. More particularly, FIG. 4 comprises six diagrams (D), (E), (F), (G), (H), and (I) representing the different possible states that pairs of memory cells of assembly (E) may have after a reset.

Diagram (D) shows the state prior to the use of the authentication method and prior to the execution of the attack. In the state of diagram (D), an initial data element Init has been written into the memory cells of pair (ok(1), nok(1)), which is the active pair. In this example, the same data element Init is written into the two memory cells of the active pair at the time of its initialization, and a data element Random is rewritten in place of data element Init into the corresponding memory cell during a rewrite step. According to an embodiment, data elements Init and Random are different, it is thus possible to differentiate a written data element (Init) from a rewritten data element (Random). More particularly, and according to an embodiment, data element Init is a data element of fixed value, and data element Random is a random data element. Other initial states can be envisaged.

Diagram (D) also shows the state obtained when the authentication method has been used and a power-off attack has been executed just before the carrying out of the rewrite step, be it the step of rewriting into memory cell ok(1) or into memory cell nok(1). It is impossible by observing this state to determine whether the authentication method has resulted in a success or in a failure, since this method is insensitive to side-channel attacks. Thus, the attacker can deduce nothing from their attack.

Diagram (E) shows the apparent state when the authentication method has resulted in a success and a power-off attack has been executed during the step of rewriting into memory cell ok(1) with data element Random, that is, during the step 202 of FIG. 2. The rewrite step having been interrupted during the attack, memory cell ok(1) no longer stores data element Init, but its reading returns data element Random or an undefined value Err. It is possible in this case to determine that the last use of the execution method is a success, since the data stored in memory cell ok(1) is different from data element Init. The step of rewriting into memory cell ok(1) may be resumed, if necessary. Further, an error detection and/or correction mechanism of the memory may be employed herein. The use of such a mechanism may be optionally executed as an alternative or additionally to the embodiment to determine whether the last use of the authentication method has resulted in a success.

Diagram (F) shows the apparent state when the authentication method has resulted in a failure and a power-off attack has been executed during the step of rewriting into memory cell nok(1) with data element Random, that is during the performance of the step 203 of FIG. 2. The rewrite step having been interrupted by the attack, memory cell nok(1) does not store data element Init, but its reading returns a data element Random or an undefined value. It is possible in this case to determine that the last trial of the execution method is a failure, since the data element stored in memory cell nok(1) is different from data element Init, and since the data element stored in memory cell ok(1) is data element Init. The step of rewriting into memory cell nok(1), the counter incrementation step, and the steps of writing into the next pair (ok(2), nok(2)) may be resumed. As previously, an error detection and/or correction mechanism may here be employed.

Diagram (G) shows the apparent state when the authentication method has resulted in a failure and a power-off attack has been executed during the step of incrementation of the failure counter associated with the authentication method, that is, during the performance of the step 204 of FIG. 2. The incrementation step having been interrupted by the attack, the value of the counter may have been unmodified. Further, the write operations of step 205 could not be performed either. It is thus possible in this case to determine that the last use of the authentication method is a failure. Indeed, if the active pair exhibits data element Random written in its second memory cell, that is, here, memory cell nok(1), and if cells ok(2) and nok(2) are erased, this indicates that the step of change of active pair could not take place. The counter incrementation step and the steps of writing into the next pair (ok(2), nok(2)) may be resumed. As previously, an error detection and/or correction mechanism may here be employed. It should be noted that if the counter incrementation could take place, the counter will be incremented twice for a single failure of the authentication method.

Diagram (H) shows the apparent state when the authentication method has resulted in a failure and a power-off attack has been executed during the step of writing of data element Init into memory cell ok(2). The write step having been interrupted by the attack, memory cell ok(2) does not store data element Init, but undetermined data element Err, and the reading from memory cell ok(2) returns an error or a data element different from value Init. It is possible in this case to determine that the last use of the authentication method is a failure, since memory cell nok(2) is erased. The steps of writing into the next pair (ok(2), nok(2)) may be resumed. A step of reading from memory cell nok(2) is performed to verify whether the write operation has been carried out properly. As previously, an error detection and/or correction may here be employed.

If the attack takes place during the counter incrementation step, the latter is performed again at the next resetting of the device.

Diagram (I) shows the apparent state when the authentication method has resulted in a failure and a power-off attack has been executed during the step of writing of data element Init into memory cell nok(2). The write step having been interrupted by the attack, memory cell nok(2) does not store data element Init, and the reading from memory cell nok(2) returns an error or a data element different from value Init. It is possible in this case to determine that the last use of the authentication method is a failure. The step of writing of data element Init into memory cell nok(2) can be resumed. A step of reading from memory cell nok(2) is performed to verify whether the write operation has been carried out properly. As previously, an error detection and/or correction mechanism may here be employed.

Various embodiments and variants have been described. Those skilled in the art will understand that certain features of these various embodiments and variants may be combined, and other variants will occur to those skilled in the art. Finally, the practical implementation of the described embodiments and variants is within the abilities of those skilled in the art based on the functional indications given hereabove.

Some embodiments may take the form of or comprise computer program products. For example, according to one embodiment there is provided a computer readable medium comprising a computer program adapted to perform one or more of the methods or functions described herein. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

In an embodiment, a device includes a memory and processing circuitry coupled to the memory. The memory is organized as a plurality of pairs of memory cells. The processing circuitry executes an authentication process, and protects the execution of the authentication process. The protecting includes storing a first data element in a first memory cell of a first pair of memory cells, and storing a second data element in a second memory cell of the first pair of memory cells, the first pair of memory cells being a current active pair of memory cells. In response to a successful authentication, the first memory cell is rewritten with a third data element. In response to a failed authentication, the second memory cell is rewritten with a fourth data element, a failure counter is incremented, a fifth data element is written into a first memory cell of a second pair of memory cells, a sixth data element is written into a second memory cell of the second pair of memory cells, and the second pair of memory cells is designated as the current active pair of memory cells.

In an embodiment, the processing circuitry, in operation, responds to a failure of the authentication process by blocking access to one or more functions of the device.

In an embodiment, the processing circuitry, in operation, executes the authentication process in response to an authentication request received from another device. In an embodiment, the device comprises an interface coupled to the processing circuitry, wherein, in operation, the authentication request is received via the interface.

In an embodiment, the device comprises a host processor coupled to the processing circuitry, wherein the processing circuitry is a secure element, which, in operation, executes the authentication process in response to an authentication request received from the host processor.

In an embodiment, in an initial state of the plurality of memory cells, all the memory cells of the plurality of memory cells are in an erased state, except for the memory cells of the first pair, the first pair being the active pair. In an embodiment, the processing circuitry, in operation, responds to a failure of the authentication method when all of the cells of plurality of cells have been written to by resetting the plurality of memory cells to the initial state.

In an embodiment, the memory comprises a non-volatile memory including the plurality of memory cells. In an embodiment, the non-volatile memory is a Flash-type memory.

In an embodiment, the first, second, fifth and sixth data elements are identical, and the third and fourth data elements are random data.

In an embodiment, a method comprises executing, using an electronic device, an authentication process, and protecting the execution of the authentication process. The protecting of the execution of the authentication process includes storing a first data element in a first memory cell of a first pair of a plurality of pairs of memory cells, and storing a second data element in a second memory cell of the first pair of memory cells, the first pair of memory cells being a current active pair of memory cells. In response to the authentication process resulting in a successful authentication, the first memory cell of the first pair of memory cells is rewritten with a third data element. In response to the authentication process resulting in a failed authentication, the second memory cell of the first pair of memory cells is rewritten with a fourth data element, a failure counter is incremented, a fifth data element is written into a first memory cell of a second pair of the plurality of pairs of memory cells, a sixth data element is written into a second memory cell of the second pair of memory cells, and the second pair of memory cells is designated as the current active pair of memory cells.

In an embodiment, the method comprises responding to a failure of the authentication process by blocking access to one or more functions of the electronic device.

In an embodiment, the method comprises executing the authentication process in response to an authentication request received from another electronic device. In an embodiment, the authentication request is received via an interface of the electronic device.

In an embodiment, the device comprises a host processor and a secure element coupled to the host processor, wherein the method comprises executing the authentication process by the secure element in response to an authentication request received by the secure element from the host processor.

In an embodiment, the method comprises initializing the plurality of memory cells to an initialized state, wherein in the initialized state all the memory cells of the plurality of memory cells are in an erased state, except for the memory cells of the first pair, the first pair being the active pair. In an embodiment, the method comprises responding to a failure of the authentication method when all of the cells of plurality of cells have been written to by resetting the plurality of memory cells to the initialized state.

In an embodiment, the first, second, fifth and sixth data elements are identical, and the third and fourth data elements are random data.

In an embodiment, a system comprises a first electronic device and a second electronic device coupled to the first electronic device. The second electronic device responds to an authentication request received from the first electronic device by executing an authentication process and protecting the execution of the authentication process. The protecting of the execution of the authentication process includes storing a first data element in a first memory cell of a first pair of a plurality of pairs of memory cells and storing a second data element in a second memory cell of the first pair of memory cells, the first pair of memory cells being a current active pair of memory cells. In response to the authentication process resulting in a successful authentication, the first memory cell of the first pair of memory cells is rewritten with a third data element. In response to the authentication process resulting in a failed authentication, the second memory cell of the first pair of memory cells is rewritten with a fourth data element, a failure counter is incremented, a fifth data element is written into a first memory cell of a second pair of the plurality of pairs of memory cells, a sixth data element is written into a second memory cell of the second pair of memory cells, and the second pair of memory cells is designated as the current active pair of memory cells.

In an embodiment, the second electronic device, in operation, responds to a failure of the authentication process by blocking access to functions or data by the first electronic device.

In an embodiment, the first electronic device is a host processor, and the second electronic device is a secure element.

In an embodiment, the first electronic device is a host processor, and the second electronic device is a smartcard.

In an embodiment, a non-transitory computer-readable medium's contents, in operation, configure a processing device to perform a method. The method comprises executing, using an electronic device, an authentication process, and protecting the execution of the authentication process. The protecting of the execution of the authentication process includes storing a first data element in a first memory cell of a first pair of a plurality of pairs of memory cells, and storing a second data element in a second memory cell of the first pair of memory cells, the first pair of memory cells being a current active pair of memory cells. In response to the authentication process resulting in a successful authentication, the first memory cell of the first pair of memory cells is rewritten with a third data element. In response to the authentication process resulting in a failed authentication, the second memory cell of the first pair of memory cells is rewritten with a fourth data element, a failure counter is incremented, a fifth data element is written into a first memory cell of a second pair of the plurality of pairs of memory cells, a sixth data element is written into a second memory cell of the second pair of memory cells, and the second pair of memory cells is designated as the current active pair of memory cells. In an embodiment, the method comprises responding to a failure of the authentication process by blocking access to one or more functions of the processing device. In an embodiment, the contents comprise instructions executable by the processing device.

In an embodiment, a protection method (200) is performed by an electronic device (100) configured to employ an authentication method (201). The electronic device includes a memory (102), the memory (102) including an assembly (E) of pairs ((ok(1), nok(1)), . . . , (ok(N), nok(N)) of memory cells including at least one first pair ((ok(1), nok(1)) including a first memory cell (ok(1)) storing a first data element (Init) and a second memory cell (no(k1)) storing a second data element (Init), the first pair ((ok(1), nok(1)) being designated as the active pair wherein the protection method includes: at each use of the authentication method (201) resulting in a success, the first memory cell (ok(1)) of said active pair is rewritten into with a third data element (Random);

at each use of the authentication method resulting in a failure, the second memory cell (nok(1)) of said active pair is rewritten into with a fourth data element (Random), after which a failure counter associated with the authentication method is incremented, and finally fifth data elements (Init) are written into a first and a second memory cells (ok(2), nok(2)) of a second pair ((ok(2), nok(2))) of memory cells different from the first pair ((ok(1), nok(1))), the second pair ((ok(2), nok(2))) becoming the active pair.

In an embodiment, an electronic device (100) is configured to perform an authentication method (201) and a protection method (200), the electronic device (100) may be summarized as including a memory (102), the memory (102) including an assembly (E) of pairs ((ok(1), nok(1)), . . . , (ok(N), nok(N)) of memory cells including at least one first pair ((ok(1), nok(1)) including a first memory cell (ok(1)) storing a first data element (Init) and a second memory cell (nok(1)) storing a second data element (Init), the first pair ((ok(1), nok(1)) being designated as the active pair, wherein the protection method includes: at each use of the authentication method (201) resulting in a success, the first memory cell (ok(1)) of said active pair is rewritten into with a third data element (Random); at each use of the authentication method resulting in a failure, the second memory cell (nok(1)) of said active pair is rewritten into with a fourth data element (Random), after which a failure counter associated with the authentication method is incremented, and finally fifth data elements (Init) are written into a first and a second memory cells (ok(2), nok(2)) of a second pair ((ok(2), nok(2))) of memory cells different from the first pair ((ok(1), nok(1))), the second pair ((ok(2), nok(2))) becoming the active pair.

In an initial state all the memory cells of the assembly (E) may be erased except for the memory cells of the first pair ((ok(1), nok(1))), the first pair being the active pair.

When the assembly (E) only includes written memory cells and a new trial of the authentication method results in a failure, a phase of resetting to the initial state may be executed.

The memory (102) may be a non-volatile memory.

The memory (102) may be a Flash-type memory.

The first, second, and fifth data elements (Init) may be all identical, and the third and fourth data elements (Random) may be random data.

In an embodiment, a computer program product may include contents to cause a processing device to perform the protection method.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a memory having a plurality of memory cells, which, in operation, are organized as a plurality of pairs of memory cells; and
processing circuitry coupled to the memory, wherein the processing circuitry, in operation:
executes an authentication process; and
protects the execution of the authentication process, the protecting of the execution of the authentication process including:
storing a first data element in a first memory cell of a first pair of the plurality of pairs of memory cells;
storing a second data element in a second memory cell of the first pair of memory cells, the first pair of memory cells being a current active pair of memory cells;
in response to the authentication process resulting in a successful authentication, rewriting the first memory cell of the first pair of memory cells with a third data element; and
in response to the authentication process resulting in a failed authentication:
rewriting the second memory cell of the first pair of memory cells with a fourth data element;
incrementing a failure counter;
writing a fifth data element into a first memory cell of a second pair of memory cells of the plurality of pairs of memory cells;
writing a sixth data element into a second memory cell of the second pair of memory cells; and
designating the second pair of memory cells as the current active pair of memory cells.

2. The device of claim 1, wherein the processing circuitry, in operation, responds to a failure of the authentication process by blocking access to one or more functions of the device.

3. The device of claim 1, wherein the processing circuitry, in operation, executes the authentication process in response to an authentication request received from another device.

4. The device of claim 3, comprising an interface coupled to the processing circuitry, wherein, in operation, the authentication request is received via the interface.

5. The device of claim 1, comprising a host processor coupled to the processing circuitry, wherein the processing circuitry is a secure element, which, in operation, executes the authentication process in response to an authentication request received from the host processor.

6. The device of claim 1, wherein in an initial state of the plurality of memory cells, all the memory cells of the plurality of memory cells are in an erased state, except for the memory cells of the first pair, the first pair being the active pair.

7. The device of claim 6, wherein the processing circuitry, in operation, responds to a failure of the authentication process when all of the cells of plurality of cells have been written to by resetting the plurality of memory cells to the initial state.

8. The device of claim 1, wherein the memory comprises a non-volatile memory including the plurality of memory cells.

9. The device of claim 8, wherein the non-volatile memory is a Flash-type memory.

10. The device of claim 1, wherein the first, second, fifth and sixth data elements are identical, and the third and fourth data elements are random data.

11. A method, comprising:
executing, using an electronic device, an authentication process; and
protecting the execution of the authentication process, the protecting of the execution of the authentication process including:
storing a first data element in a first memory cell of a first pair of a plurality of pairs of memory cells;
storing a second data element in a second memory cell of the first pair of memory cells, the first pair of memory cells being a current active pair of memory cells;
in response to the authentication process resulting in a successful authentication, rewriting the first memory cell of the first pair of memory cells with a third data element; and
in response to the authentication process resulting in a failed authentication:
rewriting the second memory cell of the first pair of memory cells with a fourth data element;

incrementing a failure counter;
writing a fifth data element into a first memory cell of a second pair of memory cells of the plurality of pairs of memory cells;
writing a sixth data element into a second memory cell of the second pair of memory cells; and
designating the second pair of memory cells as the current active pair of memory cells.

12. The method of claim 11, comprising:
responding to a failure of the authentication process by blocking access to one or more functions of the electronic device.

13. The method of claim 11, comprising:
executing the authentication process in response to an authentication request received from another electronic device.

14. The method of claim 13, wherein the authentication request is received via an interface of the electronic device.

15. The method of claim 11, wherein the device comprises a host processor and a secure element coupled to the host processor, wherein the method comprises executing the authentication process by the secure element in response to an authentication request received by the secure element from the host processor.

16. The method of claim 11, comprising initializing the plurality of memory cells to an initialized state, wherein in the initialized state all the memory cells of the plurality of memory cells are in an erased state, except for the memory cells of the first pair, the first pair being the active pair.

17. The method of claim 16, comprising responding to a failure of the authentication process when all of the cells of plurality of cells have been written to by resetting the plurality of memory cells to the initialized state.

18. The method of claim 11, wherein the first, second, fifth and sixth data elements are identical, and the third and fourth data elements are random data.

19. A system comprising:
a first electronic device; and
a second electronic device coupled to the first electronic device, wherein the second electronic device responds to an authentication request received from the first electronic device by:
executing an authentication process; and
protecting the execution of the authentication process, the protecting of the execution of the authentication process including:
storing a first data element in a first memory cell of a first pair of a plurality of pairs of memory cells;
storing a second data element in a second memory cell of the first pair of memory cells, the first pair of memory cells being a current active pair of memory cells;
in response to the authentication process resulting in a successful authentication, rewriting the first memory cell of the first pair of memory cells with a third data element; and in response to the authentication process resulting in a failed authentication:
rewriting the second memory cell of the first pair of memory cells with a fourth data element;
incrementing a failure counter;
writing a fifth data element into a first memory cell of a second pair of memory cells of the plurality of pairs of memory cells;
writing a sixth data element into a second memory cell of the second pair of memory cells; and
designating the second pair of memory cells as the current active pair of memory cells.

20. The system of claim 19, wherein the second electronic device, in operation, responds to a failure of the authentication process by blocking access to functions or data by the first electronic device.

21. The system of claim 19, wherein the first electronic device is a host processor, and the second electronic device is a secure element.

22. The system of claim 19, wherein the first electronic device is a host processor, and the second electronic device is a smartcard.

23. A non-transitory computer-readable medium having contents which, in operation, configure a processing device to perform a method, the method comprising:
executing an authentication process; and
protecting the execution of the authentication process, the protecting of the execution of the authentication process including:
storing a first data element in a first memory cell of a first pair of a plurality of pairs of memory cells;
storing a second data element in a second memory cell of the first pair of memory cells, the first pair of memory cells being a current active pair of memory cells;
in response to the authentication process resulting in a successful authentication, rewriting the first memory cell of the first pair of memory cells with a third data element; and
in response to the authentication process resulting in a failed authentication:
rewriting the second memory cell of the first pair of memory cells with a fourth data element;
incrementing a failure counter;
writing a fifth data element into a first memory cell of a second pair of memory cells of the plurality of pairs of memory cells;
writing a sixth data element into a second memory cell of the second pair of memory cells; and
designating the second pair of memory cells as the current active pair of memory cells.

24. The non-transitory computer-readable medium of claim 23, wherein the method comprises:
responding to a failure of the authentication process by blocking access to one or more functions of the processing device.

25. The non-transitory computer-readable medium of claim 23, wherein the contents comprise instructions executable by the processing device.

* * * * *